Feb. 13, 1962     E. E. EBERLE     3,021,452
SIGNAL DECREMENT DETECTOR
Filed March 20, 1959
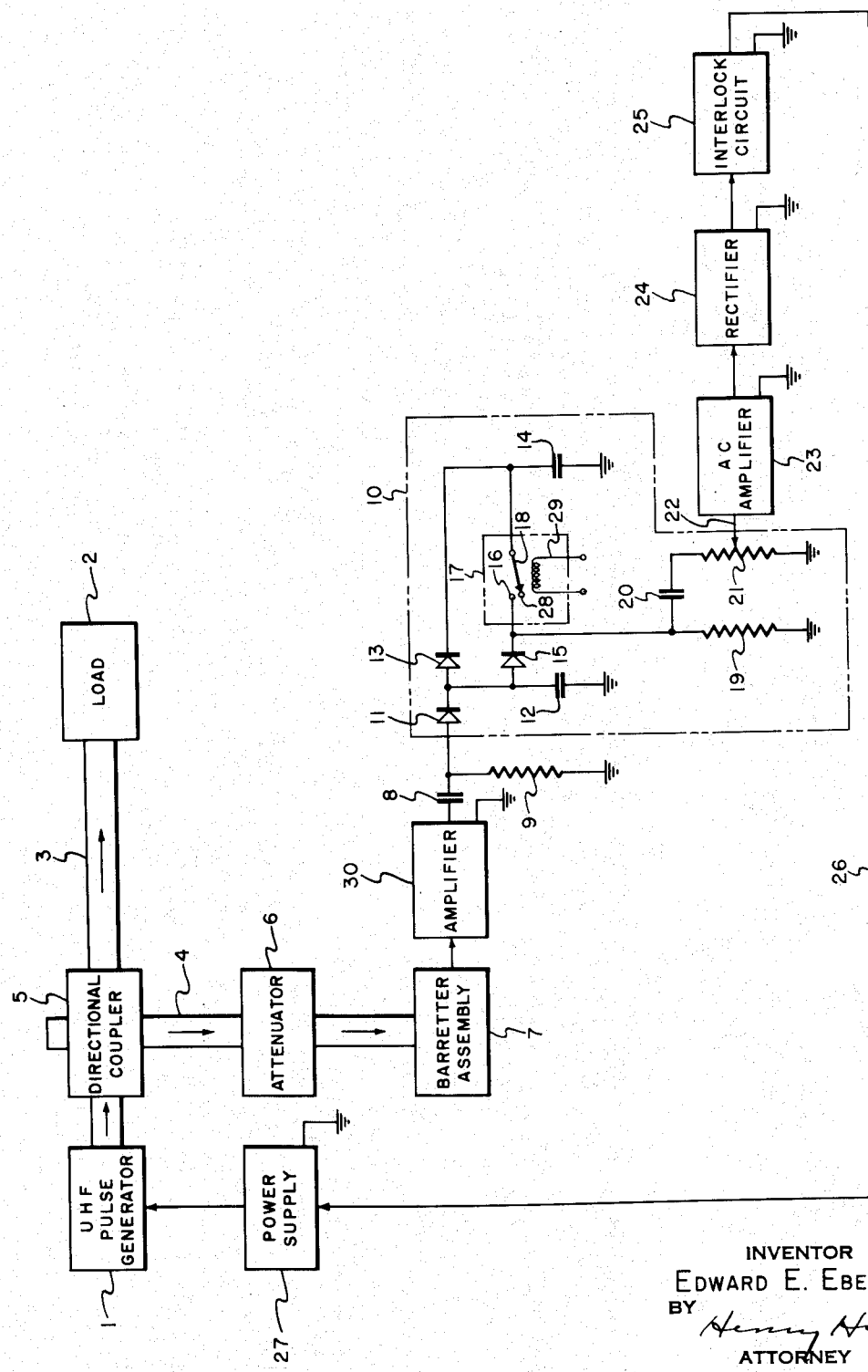
INVENTOR
EDWARD E. EBERLE
BY
ATTORNEY

3,021,452
SIGNAL DECREMENT DETECTOR
Edward E. Eberle, Floral Park, N.Y., assignor to Sperry
 Rand Corporation, Great Neck, N.Y., a corporation
 of Delaware
Filed Mar. 20, 1959, Ser. No. 800,758
3 Claims. (Cl. 317—9)

The present invention generally relates to signal amplitude monitoring apparatus and, more particularly, to a device for detecting a relatively abrupt decrease in the amplitude of a series of pulsed signals.

The detection of abrupt decreases in signal strength has particular significance in certain equipment protection applications. A radar transmitter is a familiar example of apparatus wherein a sudden decrease in the amplitude of pulsed microwave energy is usually symptomatic of serious malfunctioning. For example, consider the case of high power breakdown in the transmission line leading from the magnetron to the radar antenna. Such breakdown of the transmission line produces high levels of reflected microwave energy which if permitted to continue unchecked might seriously damage the magnetron oscillator. In accordance with the present invention, the presence of high power breakdown in a microwave transmission line is determined by monitoring the amplitude of the pulsed microwave energy flowing therein. Such amplitude is subject to an abrupt decrease upon the initiation of waveguide arcing.

It is the principal object of the present invention to provide apparatus for producing an unambiguous output in the presence of an abrupt decrease in the amplitude of a signal under surveillance.

Another object is to provide a signal decrement detector for use in a pulsed microwave energy transmitter and adapted to deactivate the transmitter upon the occurrence of an abrupt decrease in the amplitude of the pulsed signals present in the transmitter output transmission line.

A further object is to provide a simple and reliable circuit for determining the presence of high power breakdown in a pulsed microwave energy transmission line.

These and other objects of the present invention as will appear more fully upon a reading of the following specification are achieved in a preferred embodiment by the provision of means for detecting a portion of pulsed microwave energy present in a transmission line interconnecting a pulsed microwave oscillator and an output load. First and second signal storage circuits are connected to the output of the detecting means for separately storing the detected pulses of microwave energy. The storage circuits are arranged so that substantially equal signals are developed when the amplitudes of the detected pulses increase.

Individual means are provided for separately discharging the signal storage circuits at different rates although even the lesser of the discharge rates precludes any substantial discharge during the interval between successive ones of the pulsed microwave signals. Upon the abrupt decrease in amplitude or cessation of the pulsed signals, however, both signal storage circuits are substantially discharged at their respective and different rates whereby a difference in amplitude is created between their output signals. Means are provided for detecting such a signal differential and for deactivating the pulsed oscillator in response thereto.

For a more complete understanding of the invention, reference should be had to the following description and to the drawing which is a block diagram, partially schematic in form, of a preferred embodiment of the invention.

In the sole FIGURE, a source of pulsed microwave energy is represented by the numeral 1. Generator 1 may comprise, for example, a magnetron together with its associated pulse modulating circuits. Pulsed microwave signals produced by generator 1 are transmitted to load 2 by waveguide 3. Load 2, in the usual case, may be a radiating antenna. A portion of the microwave energy flowing in waveguide 3 is diverted to waveguide 4 by directional coupler 5. The coupled signal present in waveguide 4 is reduced, if necessary, to a convenient amplitude by attenuator 6 and then detected by barretter assembly 7. Assembly 7 includes a barretter and its associated waveguide mount and direct current source for producing an output video pulse in response to each incident microwave pulse.

The video signal output of assembly 7 is amplified by amplifier 30 and then coupled by capacitor 8 and resistor 9 to pulse decrement detector 10. Detector 10 includes diode 11 which connects the junction of capacitor 8 and resistor 9 to a first terminal of capacitor 12, the second terminal of which is grounded. Diode 13 connects the junction of diode 11 and capacitor 12 to a first terminal of capacitor 14, the other terminal of which is grounded. Diode 15 couples the junction of diode 11 and capacitor 12 to contact 16 of electromechanical chopper 17. Movable arm 18 of chopper 17 is connected to the junction of diode 13 and capacitor 14.

Contact 16 of chopper 17 is connected to the junction of diode 15 and grounded resistor 19. The signal developed across resistor 19 is coupled by capacitor 20 to potentiometer 21. A selectable portion of the signal appearing across potentiometer 21 is applied by wiper 22 to alternating current amplifier 23. The alternating signal output of amplifier 23 is converted to a direct current signal in rectifier 24 whose output is applied to and actuates interlock circuit 25. Circut 25 is connected by line 26 to power supply 27, the latter of which energizes generator 1. Power supply 27 is energized or not depending upon the condition of interlock circuit 25.

In operation, generator 1 produces a recurrent series of pulsed microwave signals which are normally dissipated in matched load 2. A portion of the pulsed signals flowing from generator 1 to load 2 is coupled out of transmission line 3 and detected in barretter assembly 7. The pulsed video signals at the output of assembly 7, having amplitudes related to the energy level of the signals present in waveguide 3 are coupled by capacitor 8 and resistor 9 to the input of pulse decrement detector 10. The video pulses charge capacitors 12 and 14 positively with respect to ground. Capacitor 12 is charged through diode 11 while capacitor 14 is charged through diodes 11 and 13. The capacity of capacitor 14 preferably is greater than that of capacitor 12. Capacitors 12 and 14 are each discharged through resistor 19 upon the decrease in amplitude or in the absence of video pulses at the output of assembly 7. The higher capacity of capacitor 14 is a factor in decreasing the rate of discharge of capacitor 14 relative to that of capacitor 12.

Arm 18 of chopper 17 alternately contacts contacts 16 and 28 at a frequency determined by that of an alternating excitation signal applied to driving coil 29. It should be noted that capacitor 14 is permitted to discharge through resistor 19 only during the time intervals when arm 18 of chopper 17 is in contact with contact 16, which action further decreases the rate of discharge of capacitor 14 relative to that of capacitor 12.

Diode 11 and capacitor 12 comprise a first peak detecting circuit while diodes 11 and 13 and capacitor 14 form a second peak detecting circuit. The relative magnitudes of the charging time constants of the two peak detecting circuits is of no particular moment but in a representative case will be relatively long with respect to the recurrence interval of the video pulses at the output of barretter assembly 7. Thus, capacitors 12 and 14 are charged in staircase fashion in response to increasing amplitudes of the successive input video pulses. Despite the differing charging time constants, the potentials across capacitors 12 and 14 are substantially the same because capacitor 12, which has the faster charging time constant, is prevented from attaining a charge appreciably higher than the charge on capacitor 14 by the equalizing current that flows from capacitor 12 to capacitor 14 via diode 13 and also through diode 15 when arm 18 of chopper 17 is in contact with contact 16.

During the interval between the recurrent video pulses at the output of assembly 7, both capacitors 12 and 14 tend to discharge through resistor 19. However the time constants of the discharge circuits for capacitors 12 and 14 are made relatively long with respect to the pulse recurrence interval so that neither capacitor discharges to any appreciable extent during such time.

In the event of the disappearance or rapid decrease in amplitude of the video pulses at the output of barretter 7, the originally substantially equal potential across capacitors 12 and 14 quickly becomes unequal. Diodes 13 and 15 preclude the discharge of capacitor 14 through capacitor 12. Diode 11 prevents the discharge of capacitor 12 through resistor 9. Capacitor 14 is isolated from resistor 19 by the back-to-back connected diodes 13 and 15 during the time that arm 18 of chopper 17 engages contact 28. Thus, only capacitor 12 discharges through resistor 19 during said time.

As previously discussed, the rate of discharge of capacitor 12 through resistor 19 is greater than the rate of discharge of capacitor 14 through resistor 19. Consequently, the potential across capacitor 12 falls at a greater rate than the potential across capacitor 14. As soon as the potential across capacitor 14 becomes greater than that across capacitor 12, diode 15 becomes back biased (blocked) each time that the arm 18 of chopper 17 engages contact 16. The back bias, of course, is removed each time that arm 18 engages contact 28. The result is that the lesser potential of capacitor 12 is applied across resistor 19 each time that arm 18 engages contact 28 whereas the greater potential of capacitor 14 is applied across resistor 19 each time that arm 18 engages contact 16. Thus, there is produced across resistor 19 a substantially square wave of voltage having a peak-to-peak potential related to the difference between the voltages appearing across capacitor 14 and capacitor 12.

The alternating square wave signal developed across resistor 19 is amplified and then rectified and applied to interlock circuit 25. Circuit 25 may be, for example, a relay circuit which is energized by the direct current output signal of rectifier 24 which is produced in consequence of a difference in potential across capacitors 12 and 14. The actuation of circuit 25 deenergizes power supply 27 and, in turn, deactivates generator 1.

The above-described difference in potential between capacitors 12 and 14 arises in the sole event of an abrupt decreases in the amplitudes of the recurrent pulses of microwave energy present in waveguide 3. As previously noted, substantially the same potential appears across capacitors 12 and 14 in the cases of maintained amplitude or an increase in the amplitude of the microwave pulses. In the presence of high power breakdown in waveguide 3, the amplitude of the microwave pulses propagating in waveguide 3 abruptly decreases to a lowered value and remains at that lowered value so long as the breakdown continues. The sudden and maintained decreases in amplitude of the microwave pulses permits the substantial discharge of capacitors 12 and 14 whereupon the voltage differential for actuating interlock circuit 25 is produced.

From the preceding it can be seen that the objects of the present invention have been achieved by the provision in a preferred embodiment of the present invention of means for detecting the energy levels of pulsed microwave signals flowing in a transmission line. A portion of the microwave signals is detected and applied to first and second peak detectors which are arranged to equally follow increases in the amplitudes of the detected pulses. The discharging time constants of the peak detectors are designed to be substantially different whereby a voltage differential is produced between the outputs of the first and second peak detectors upon the sudden and maintained decrease in amplitude of the microgwave signal. Means are included, responsive to said voltage differential, for deactivating the source of the pulsed microwave signals.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus for detecting abrupt decrements in the amplitude of a recurrent series of a pulses under surveillance, said apparatus comprising first and second capacitors and first and second unidirectional impedances, said first impedance applying said pulses to said first capacitor and said second impedance applying said pulses to said second capacitor, a third impedance for discharging said first and second capacitors, means for connecting said first capacitor across said third impedance to provide a first circuit for discharging said first capacitor, and means for intermittently connecting said second capacitor across said third impedance means to provide a second circuit for discharging said second capacitor, the time constant of one of said circuits being different from the time constant of the other of said circuits, whereby an alternating signal component is developed across said third impedance having a peak-to-peak amplitude related to the amplitude differential between the potentials developed across said first and second capacitors.

2. Apparatus for detecting abrupt decrements in the amplitudes of a recurrent series of pulses under surveillance, said apparatus comprising first and second capacitors and first and second diodes, said first diode applying said pulses to said first capacitor and said first and second diodes applying said pulses to said sceond capacitor, impedance means for discharging said first and second capacitors, means for connecting said first capacitor across said impedance means to provide a first circuit for discharging said first capacitor, and means for intermittently connecting said second capacitor across said impedance means to provide a second circuit for discharging said second capacitor, the time constant of one of said circuits being different from the time constant of the other of said circuits, whereby an alternating signal component is developed across said impedance means having a peak-to-peak amplitude related to the amplitude differential between the signals developed across said first and second capacitors.

3. Apparatus for monitoring the amplitudes of a recurrent series of pulses, said apparatus comprising first and second capacitors and first and second diodes, said first diode applying said pulses to said first capacitor and said first and second diodes applying said pulses to said second capacitor, impedance means for discharging said first and second capacitors, a third diode connecting said first capacitor to said impedance to provide a first circuit for discharging said first capacitor means, and switching means for intermittently connecting said second capacitor across said impedance means to provide a second circuit for discharging said second capacitor, the time constant of one of said circuits being different from the time constant of the other of said circuits, whereby an alternating signal component is developed across said impedance means in the presence of an amplitude differential between the potentials developed across said first and second capacitors.

References Cited in the file of this patent

UNITED STATES PATENTS

| | | |
|---|---|---|
| 2,498,720 | Wild | Feb. 28, 1950 |
| 2,546,500 | Hall | Mar. 27, 1951 |
| 2,621,263 | Scoles | Dec. 9, 1952 |
| 2,815,445 | Young | Dec. 3, 1957 |
| 2,860,244 | Crowley | Nov. 11, 1958 |

OTHER REFERENCES

Electronics, February 1956; pages 178, 180, 182, 184 and 186.